3,147,307
SULFUR-CONTAINING SCHIFF'S BASES
Rodney D. Moss and Pamela M. Hamilton, Midland, Mich., assignors to The Dow Chemical Company, Midland, Mich., a corporation of Delaware
No Drawing. Filed Sept. 27, 1961, Ser. No. 140,992
13 Claims. (Cl. 260—566)

This invention relates to a new class of chemical compounds. These new compounds are Schiff's bases formed by the condensation of salicylaldehydes with certain sulfur-containing amines and they are represented by the structure:

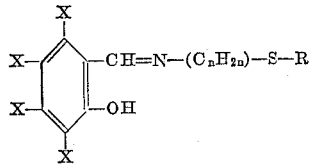

wherein X is an inert substituent, n is an integer from two to three, and R is aryl, substituted aryl, aralkyl, alkenyl, or alkyl, the latter with the provision that R is alkyl of at least four carbon atoms when n is two. By inert substituent is meant one which is chemically relatively unreactive and X therefore represents such substituents as hydrogen, alkyl, alkoxy, nitro, or halogen, the term halogen including fluorine, chlorine, bromine, and iodine. The symbol R represents such radicals as methyl, ethyl, butyl, octyl, dodecyl, octadecyl, vinyl, allyl, butenyl, hexenyl, benzyl, phenethyl, phenylbutyl, phenyl, alkylphenyl, halophenyl, nitrophenyl, hydroxphenyl, and aromatic radicals having a plurality of or mixed alkyl, halo, nitro, or hydroxy substituents.

The new compounds are yellowish oils or crystalline solids and they are easily obtained by reacting a salicylaldehyde with a sulfur-containing amine of the formula $R—S—(C_nH_{2n})—NH_2$ at about 0–100° C. The relative proportion of the two reactants is not critical and the reaction is run by contacting the reactants in the liquid phase, with or without the added presence of an inert solvent.

Most conveniently, the reaction is carried out by heating to reflux temperature an inert solvent solution of the amine and the salicylaldehyde, the two reactants preferably being present in equal molar proportions. The solvent is then removed from the reaction mixture in large part or in entirety by evaporation or distillation and the desired product is separated from the residue by distillation or crystallization. Unreactive solvents suitable for use in the process include lower aliphatic ethers and alcohols, methyl acetate, tetrahydrofuran, hexane, benzene, and similar substances. Example 1 illustrates a typical preparation.

EXAMPLE 1

A solution of 76.5 g. of 2-(phenylthio)ethylamine in 500 cc. of absolute ethyl alcohol was made up in a liter flask equipped with a mechanical stirrer, reflux condenser, dropping funnel, and a thermometer. To the stirred solution there was added a solution of 61 g. of salicylaldehyde in 250 cc. of absolute ethyl alcohol over a period of one hour. The alcohol solvent was removed by distillation and the remaining reaction product was distilled under reduced pressure to obtain 122.3 g. of a yellow oil, B.P. 183–195° C./0.2 mm. This product was identified by elemental analysis and infrared spectroscopic examination as the expected α-(2-(phenylthio)ethylimino)-o-cresol.

In the same way, other compounds were prepared having the structure previously defined. The products, their properties, and the yields obtained are listed in Table 1. Their identities as the chemical compounds named were confirmed as in Example 1. Yields are calculated on the basis of the quantity of salicylaldehyde put into the reaction mixture. In the column headed "X" is listed any substituents other than hydrogen on the salicylaldehyde reactant. It is to be understood that the substituents are hydrogen unless otherwise specified.

Table I

| X | n | R | Percent Yield | B.P., ° C./mm. | M.P., ° C. |
|---|---|---|---|---|---|
| H | 2 | p-chlorophenyl | 94 |  | 44–5 |
| H | 2 | p-tert-butylphenyl | 87 | 226–7/1.5 |  |
| 4-tert.-butyl | 2 | phenyl | 97 | ($N_D^{25}$=1.6000) |  |
| 4,6-dichloro | 2 | p-nitrophenyl | 50 |  | 136–8 |
| Do | 2 | p-hydroxyphenyl | 93 |  | 197–9 |
| Do | 2 | o-hydroxyphenyl | 91 |  | 126–7 |
| Do | 2 | x-xylyl | 65 | ($N_D^{25}$=1.6313) |  |
| Do | 2 | allyl | 10 |  | 32 |
| H | 2 | benzyl | 71 | 183–6/0.1 |  |
| H | 2 | butyl | 86 | 150–7/2.0 |  |
| H | 2 | octyl | 92 | 163–6/0.3 |  |
| 4-bromo | 2 | dodecyl | 76 |  | 39–40 |
| 4-tert.-butyl | 2 | do | 40 | 239–243/1.3 |  |
| 4-nitro | 2 | do | 86 |  | 85–6 |
| 6-methoxy | 2 | do | 93 |  | 40–1 |
| 4-chloro | 2 | do | 67 |  | 43–4 |
| 4-bromo | 3 | ethyl | 45 | 181–4/1.3 |  |
| H | 2 | dodecyl | 97 |  | 37 |

By the procedure of Example 1, there may be prepared other compounds within the general formula shown above and having properties similar to those of the compounds listed. Among such compounds are:

α-(3-(benzylthio)propylimino)-o-cresol;
α-(2-(phenylthio)propylimino)-o-cresol;
α-(3-(p-nitrophenylthio)propylimino)-o-cresol;
α-(2-(vinylthio)ethylimino)-o-cresol;
α-(2-(butenylthio)ethylimino)-o-cresol;
α-(2-(hexenylthio)propylimino)-o-cresol;
α-(2-(octenylthio)ethylimino)-o-cresol;
α-(2-(hexadecenylthio)ethylimino)-o-cresol;
α-(3-(allylthio)propylimino)-o-cresol;
α-(3-(decenylthio)propylimino)-4-nitro-o-cresol;
4-ethoxy-α-(2-(octadecenylthio)propylimino)-o-cresol;
4-chloro-α-(2-(octadecylthio)ethylimino)-o-cresol;
4,6-dichloro-α-(2-(nonylthio)propylimino)-o-cresol;
α-(3-(heptadecylthio)propylimino)-4-pentyl-o-cresol;

and homologs and analogs of these.

These compounds are useful as contact or stomach poison insecticides when applied as aqueous dispersions of 500 p.p.m. concentration. The compounds having the structure wherein R is alkyl of at least four carbon atoms or substituted aryl are active nematocides, being particularly effective for the control of pig ascarids when mixed with the diet in concentrations of about 0.1 percent by weight and giving efficient control of rootknot nematodes when applied to infested soil in aqueous dispersions of as low as 10 parts per million concentration.

The compounds are also useful as a general class as soil bonding and waterproofing agents when incorporated into soil in concentrations of the order of 1 percent.

We claim:
1. Compounds having the structure

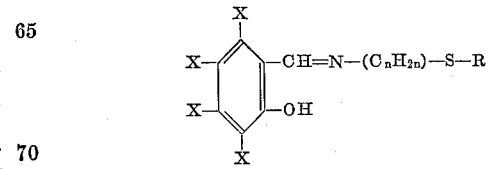

wherein X is a substituent selected from the group consisting of hydrogen, halogen, nitro, lower alkoxy, and lower alkyl, n is an integer from two to three, and R is selected from the group consisting of alkyl of 4–18 carbon atoms when n=2, alkyl of 1–18 carbon atoms when n=3, alkenyl of 2–18 carbon atoms, phenyl (lower alkyl), phenyl, and phenyl having as sole substituents thereon at least one substituent selected from the group consisting of halogen, nitro, hydroxy, and lower alkyl.

2. The compound of claim 1 wherein each X is hydrogen and R is phenyl having as sole substituents thereon at least one substituent selected from the group consisting of halogen, nitro, hydroxy, and lower alkyl.

3. The compound of claim 1 wherein two X's are halogen, the two remaining X's are hydrogen, and R is phenyl having as sole substituents thereon at least one substituent selected from the group consisting of halogen, nitro, hydroxy, and lower alkyl.

4. The compound of claim 1 wherein each X is hydrogen, n is 2, and R is alkyl of 4 to 18 carbon atoms.

5. α-(2-(p-tert.-butylphenylthio)ethylimino)-o-cresol.
6. 4-tert.-butyl-α-(2-(phenylthio)ethylimino)-o-cresol.
7. 4,6 - dichloro-α-(2-(p-hydrophenylthio)ethylimino)-o-cresol.
8. 4,6-dichloro-α-(2-(xylylthio)ethylimino)-o-cresol.
9. α-(2-(allylthio)ethylimino)-4,6-dichloro-o-cresol.
10. α-(2-(butylthio)ethylimino)-o-cresol.
11. α-(2-(octylthio)ethylimino)-o-cresol.
12. α-(2-(dodecylthio)ethylimino)-o-cresol.
13. 4-bromo-α-(3-(ethylthio)propylimino)-o-cresol.

References Cited in the file of this patent
UNITED STATES PATENTS

| | | |
|---|---|---|
| 2,516,293 | Benson | July 25, 1950 |
| 2,684,976 | Glickman | July 27, 1954 |
| 2,847,472 | Robertson | Aug. 12, 1958 |
| 2,907,790 | Frost | Oct. 6, 1959 |
| 2,923,661 | Cavallito | Feb. 2, 1960 |

OTHER REFERENCES

Conant et al.: "The Chemistry of Organic Compound," 4th ed., page 335 (1954).

Hieduschka et al.: J. Prakt Chem., vol. 196, pp. 425–442 (1913).